(12) United States Patent
Wu et al.

(10) Patent No.: US 8,671,862 B2
(45) Date of Patent: Mar. 18, 2014

(54) DEVICE WITH MICROBUBBLE-INDUCED SUPERHYDROPHOBIC SURFACES FOR DRAG REDUCTION AND BIOFOULING PREVENTION AND DEVICE FOR BIOFOULING PREVENTION

(76) Inventors: Kee-Rong Wu, Kaohsiung (TW);
Yu-Tsuen Shyu, Kaohsiung (TW);
Chung-Hsuang Hung, Kaohsiung (TW); Jui-Ching Sun, Kaohsiung (TW);
Jiing-Kate Wu, Tainan (TW)

( * ) Notice: Subject to any disclaimer, the term of this patent is extended or adjusted under 35 U.S.C. 154(b) by 181 days.

(21) Appl. No.: 13/296,424

(22) Filed: Nov. 15, 2011

(65) Prior Publication Data
US 2012/0247383 A1   Oct. 4, 2012

(30) Foreign Application Priority Data

Mar. 30, 2011  (TW) .............................. 100111150 A

(51) Int. Cl.
*B63B 1/38* (2006.01)
(52) U.S. Cl.
USPC ........................................................ 114/67 A

(58) Field of Classification Search
USPC ................................................ 114/67 A, 67 R
See application file for complete search history.

(56) References Cited

U.S. PATENT DOCUMENTS

| | | | | |
|---|---|---|---|---|
| 3,069,336 | A * | 12/1962 | Waite et al. | 205/731 |
| 6,994,045 | B2 * | 2/2006 | Paszkowski | 114/67 R |

* cited by examiner

*Primary Examiner* — Stephen Avila
(74) *Attorney, Agent, or Firm* — Rosenberg, Klein & Lee

(57) ABSTRACT

A device with microbubble-induced superhydrophobic surfaces for drag reduction and biofouling prevention includes an anodic microporous plate, a cathodic microporous plate, and a DC power supply. The anodic microporous plate and the cathodic microporous plate are mounted to a hull surface of a ship. The DC power supply includes a positive pole electrically connected to the anodic microporous plate and a negative pole electrically connected to the cathodic microporous plate. Seawater is electrolyzed to generate hydrogen microbubbles adjacent to a surface of the cathodic microporous plate and to generate oxygen microbubbles adjacent to a surface of the anodic microporous plate, forming superhydrophobic surfaces on the surfaces of the anodic microporous plate and the cathodic microporous plate. Electric current flows through the anodic microporous plate and the cathodic microporous plate to prevent biofouling.

8 Claims, 12 Drawing Sheets

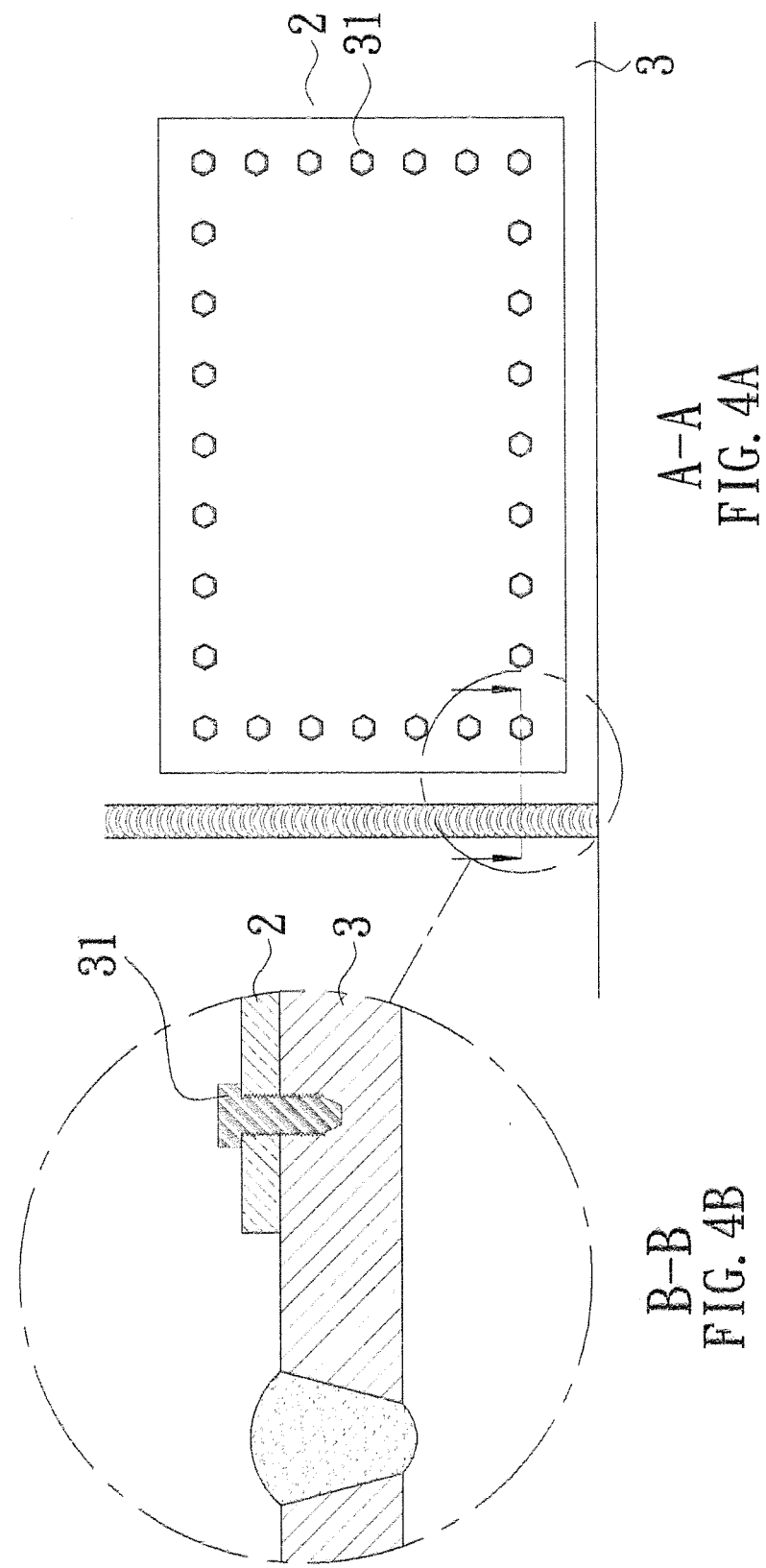

DEVICE WITH MICROBUBBLE-INDUCED SUPERHYDROPHOBIC SURFACES FOR DRAG REDUCTION AND BIOFOULING PREVENTION AND DEVICE FOR BIOFOULING PREVENTION

BACKGROUND OF THE INVENTION

The invention relates to a device with microbubble-induced superhydrophobic surfaces for drag reduction and biofouling prevention and a device for biofouling prevention.

Overcoming resistances is the basic requirement for ships. FIGS. 1A and 1B show a ship moving at a speed V. The resistances to the ship include about 85%-95% of frictional resistance $R_F$ and wave making resistance $R_W$, about 3%-5% of vortex flow loss $R_E$, and 2% (for a low-speed ship) to 10% (for a high-speed ship) of air resistance $R_A$. The affect of the frictional resistance $R_F$ to a low-speed ship (about 15 nautical miles per hour) is significant and may be up to 90%.

Thus, how to reduce the frictional resistance $R_F$ so as to reduce the energy consumption for moving a ship has been an important issue in fluid dynamic research of ships. Many methods for reducing the frictional resistance $R_F$, such as surface structure with riblets for biomimetic drag reduction, artificial microblowing, microbubble injection, surface coating for reducing drag, or nanotechniques, have been proposed. Among these methods, the surface coating is the most convenient and most economical but least eco-friendly whereas the microbubble injection is the most eco-friendly and provides excellent drag reducing effect.

The earliest microbubble drag reducing technique was disclosed by M. Mc Cormick and R. Bhattacharya in 1973. In 1985, N. Madavan obtained drag reducing effect up to 80% in microbubble drag reduction experiments in 1985 by passing compressed air through porous plates, which was confirmed by a research of H. Kato in 1994 by using an identical experimental apparatus. Thus, microbubble drag reduction devices passing compressed air through porous plates have been widely used in research institutes throughout the world.

However, the drag reducing effect of the microbubble drag reduction devices on an actual ship is less than 2%. Reasons of such a tremendous difference could be:

1. The diameters of the bubbles generated by the porous plates are so large that the bubbles overlap and become larger due to buoyant effect. The larger bubbles could adhere to the hull surface and increase the resistance to the hull. On the other hand, the larger bubbles could escape and, thus, could not remain in the effective boundary layer. As a result, the larger bubbles move to the water surface and, thus, fail to provide the drag reducing effect.
2. The area of the hull surface of the actual ship covered by the porous plates is too small (see FIG. 2A), such that the microbubbles could not cover most of the hull surface below the water surface.
3. When the amount of air supplied to the porous plates is increased, the microbubbles are apt to overflow out of the boundary layer under the action of vertical velocity that is created while injecting the microbubbles into the flow field around the hull, leading to adverse affect to the drag reducing efficiency.

FIGS. 2A and 2B show an example of a conventional microbubble drag reduction device mounted on a ship. The microbubble drag reduction device includes a blower A mounted on a deck for compressing air. The compressed air is delivered through an air pipeline (not shown) to a porous plate C mounted on a bottom plate B of the ship. Microbubbles are formed and injected into the flow field of the seawater. The porous plate C is generally located adjacent to the how to obtain the maximal drag reducing effect. However, two side boards D of the bottom plate B intended for restraining the microbubbles and preventing overflow of the microbubbles cause low utility ratio of the microbubbles. In addition to the low drag reducing efficiency, the conventional microbubble drag reduction device incurs many structural safety problems including the risks of sealing of the hull, corrosion of the hull, and biofouling of marine organisms. Further, the bubbles injected into the seawater reduce the propelling efficiency of the vanes of the propeller by about 3% and cause surface cavitation corrosion of the vanes.

Thus, in actual practice of drag reduction of a ship, it is necessary to increase the hull surface area covered by bubbles, to avoid the bubbles from becoming larger due to overlapping, and to prevent the bubbles from overflowing out of the boundary layer on the premise of preventing adverse affect to the structural safety of the ship.

In view of the many disadvantages of the microbubble drag reduction device passing compressed air through porous plates, R. Wedin of France generates microbubbles by electrolysis. The microbubbles have a diameter much smaller than (about ⅛ of) the diameter of the microbubbles generated by the porous plates made of porous material. Furthermore, after formation of nucleuses of the microbubbles on the electrode surface, the flow field of the hull can directly carry the microbubbles to a downstream side of the hull, such that the microbubbles can be distributed over the hull surface below the water surface while avoiding the problem of deviation away from the boundary layer under the action of vertical velocity. The drag reducing effect can be maximized.

However, the amount of air generated is too small, and the energy conversion ratio of the energy saved in reducing drag to the inputted electricity is small. If it is intended to generate a large amount of microbubbles, the energy consumed will be significantly increased, and heat convection resulting from increased electric current will occur.

On the other hand, some marine organisms love to adhere to the hull surface that is continually submerged below the water surface, increasing the roughness of the hull surface and increasing the overall weight of the hull up by to 75% and, thus, leading to reduction in the speed of the ship. Taking a ship moving at a speed of 15 nautical miles per hour as an example, in a case that the marine biofouling is serious, the resistance to the ship may be increased by up to 80%, the fuel consumption may be increased by up to 86%, and the engine will discharge a large amount of exhaust gas. Furthermore, the marine organisms adhered to the hull surface below the water surface increase the corrosion speed of the steel sheets of the hull and may even risk the safety of the machine and maneuver of the ship. Further, the marine organisms inhabit any artificial structure or tool, such as set nets, anchor chains, and cooling pipelines of generators, speeding up metal corrosion or increasing the flow resistance of water.

In a conventional technique, anti-fouling paint is coated on the hull surface to prevent marine biofouling on the hull surface below the water surface. Among various anti-fouling paint, self-polishing copolymer tributyltin (TBT) paint is commonly used, because it is more toxic but stable and may last up to 60 months. However, self-polishing copolymer TBT paint is detrimental to the ocean environment, the marine creatures, and human bodies. Therefore, the International Maritime Organization (IMO) has forbidden use of self-polishing copolymer TBT paint on hulls since Jan. 1, 2008 to mitigate damage to the ocean environment. Several substitutes have been developed in the art, such as:

1. Copper-based anti-fouling paint: The toxicity of copper-based anti-fouling paint is less than TBT 1000 times. However the cooper-based anti-fouling paint is effective only on animal organisms. Weedicide must be added to achieve the antifouling purposes. Thus, use of the copper-based anti-fouling paint containing weedicide may be controlled in the future in view of the potential new threat to the environment by the concealed toxicity.

2. Tin-free anti-fouling paint: The effective period of tin-free anti-fouling paint is about 24 months, which is shorter than TBT. Tin-free anti-fouling paint is suitable for ships that require frequent maintenance in dock, such as passenger ships.

3. Non-stick coatings: Non-stick coatings are biocide free and have sleek surfaces to cause difficulty in adherence of contaminants and to allow easy removal of the adhered contaminants. Non-stick coatings are suitable for high-speed ships moving at a speed higher than 30 knots and have small frictional resistance. However, repair of broken non-sticking coatings is not easy.

4. Application of external electric current by conductive paint or conductive material: Although this method is more effective than tin-free antifouling paint, the cost is high and damage occurs easily. Furthermore, this method consumes considerable electricity and increases the possibility of corrosion of the hull.

In the above techniques, the antifouling paint (whether non-toxic paint or conductive paint) must be coated on the hull surface through use of toluene containing volatile organic compounds (VOC) that are detrimental to the environment.

Further, in conductive paint developed by Mitsubishi Heavy Industries of Japan, disclosed in Taiwan Patent No. 128362 issued in 2007 and entitled "SYSTEM AND METHOD FOR INHIBITING MARINE BIOFOULING BY CONDUCTIVE RUBBER COATING", and disclosed in Taiwan Patent No. 514680 issued in 2002 and entitled "SYSTEM AND METHOD FOR ANTIFOULING", extremely toxic chlorine gas obtained from electrolysis is used in inhibiting marine organisms.

In an exception, T. Nakayama of Japan alternatively applied direct current of 1.0 V and −0.6V (slightly lower than the voltage for obtaining chlorine gas by electrolysis) on a film of titanium nitride (TiN) and found effective inhibition of marine biofouling after 279 days of experiment in seawater. The inhibiting mechanism was based on micro electric current that destroys the micro organisms on which the marine organisms feed. Thus, parasitism of microbial films could be inhibited, avoiding adherence and growth of marine organisms including barnacles, tube worms, and oysters. Thus, this antifouling method is eco-friendly. However, preparation of the titanium nitride film requires expensive small-area reactive magnetron sputtering or expensive small-area radio-frequency arc spray.

BRIEF SUMMARY OF THE INVENTION

In an aspect of the invention, a device with microbubble-induced superhydrophobic surfaces for drag reduction and biofouling prevention includes an anodic microporous plate, a cathodic microporous plate, and a DC power supply. The anodic microporous plate and the cathodic microporous plate are adapted to be mounted to a hull surface of a ship. The DC power supply includes a positive pole electrically connected to the anodic microporous plate and a negative pole electrically connected to the cathodic microporous plate. Seawater is electrolyzed to generate hydrogen microbubbles adjacent to a surface of the cathodic microporous plate and to generate oxygen microbubbles adjacent to a surface of the anodic microporous plate, forming superhydrophobic surfaces on the surfaces of the anodic microporous plate and the cathodic microporous plate. Electric current flows through the anodic microporous plate and the cathodic microporous plate to prevent biofouling.

The surface of each of the anodic microporous plate and the cathodic microporous plate includes a plurality of micropores that is formed in a surface of a substrate after microarc oxidation or anodic oxidation of the substrate. A layer of graphite or platinum can be coated on a surface of the substrate after microarc oxidation or anodic oxidation. The substrate is a titanium plate, an aluminum plate, or a titanium alloy plate containing more than 50% of titanium.

In another aspect of the invention, a device for biofouling prevention includes a microporous plate and a power supply. The microporous plate is adapted to be mounted to a hull surface. The power supply includes two poles electrically connected to the microporous plate. Electric current flows through the microporous plate to prevent biofouling. The microporous plate is a substrate subjected to microarc oxidation or anodic oxidation. A layer of graphite or platinum can be coated on a surface of the substrate after microarc oxidation or anodic oxidation. The substrate is a titanium plate, an aluminum plate, or a titanium alloy plate containing more than 50% of titanium.

After microarc oxidation or anodic oxidation of a substrate, a microporous plate having a larger area and having a high specific surface area can be obtained at low costs, avoiding the disadvantages of high costs and small area of titanium nitride film. Furthermore, no toxic substance is released when electricity is supplied to the microplate, avoiding threat to the ocean environment, marine creatures, and human.

The invention will become clearer in light of the following detailed description of illustrative embodiments of this invention described in connection with the drawings.

DESCRIPTION OF THE DRAWINGS

FIG. 4A shows attachment of an anodic microporous plate or a cathodic microporous plate to the bottom plate of the hull.

FIG. 4B shows an enlarged view of a circled portion of FIG. 4A.

DETAILED DESCRIPTION OF THE INVENTION

Figure 5:
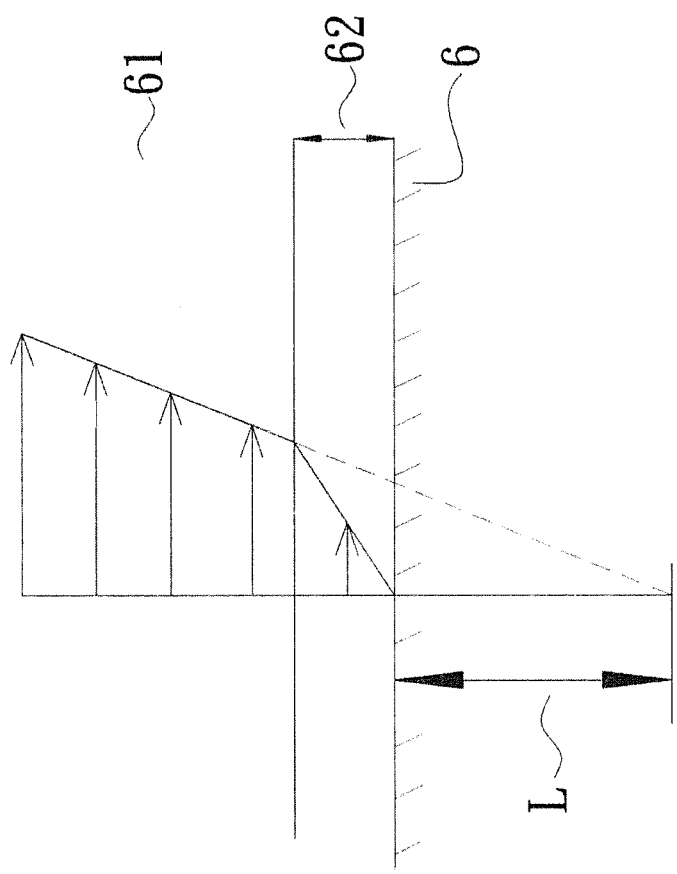
FIG. 5 shows slip effect between the seawater and the hull surface below the sea surface, wherein the arrows indicate the velocity gradient of the seawater relative to the hull.
Figure 6:
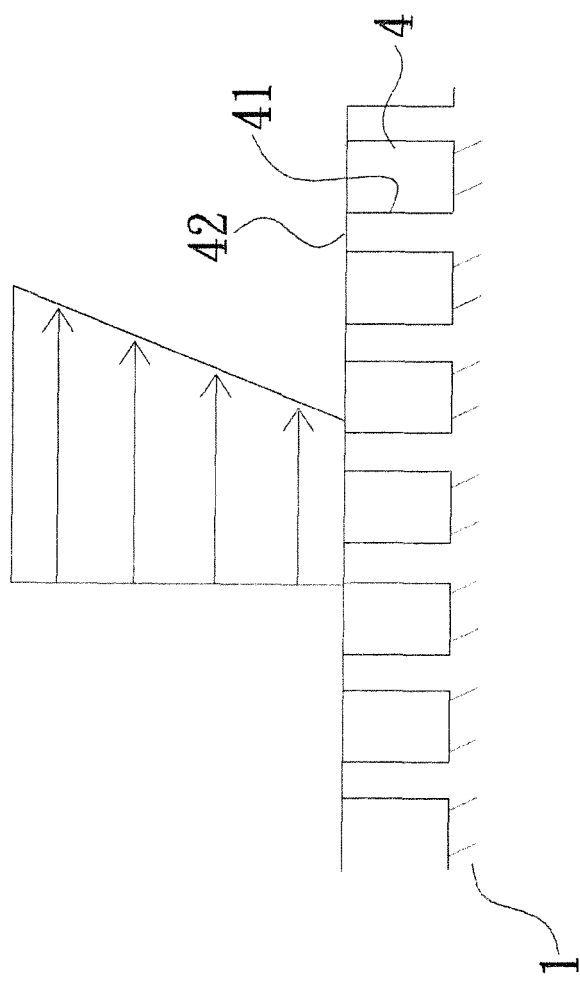
FIG. 6 shows ideal slip effect on the anodic microporous plate or cathodic microporous plate according the present invention, wherein the arrows indicate the velocity gradient of the seawater relative to the hull.

With reference to FIGS. 3A, 3B, 4A, 4B, 5, and 6, a device with microbubble-induced superhydrophobic surfaces for drag reduction and biofouling prevention includes a plurality of anodic microporous plates 1 and a plurality of cathodic microporous plates 2 mounted to a hull surface of a ship. In this embodiment, the anodic microporous plates 1 and the cathodic microporous plates 2 are mounted to a bottom plate 3 of the hull. Each of the anodic microporous plates 1 and the cathodic microporous plates 2 includes a surface having a plurality of micropores 4. The structure of each cathodic microporous plate 2 is identical to that of each anodic microporous plate 1, which is shown in FIG. 6. The device with microbubble-induced superhydrophobic surfaces for drag reduction and biofouling prevention further includes a direct current (DC) power supply 5. The DC power supply 5 includes a positive pole electrically connected to each anodic microporous plate 1 and a negative pole electrically connected to each cathodic microporous plate 2. In this embodiment, the anodic microporous plates 1 and the cathodic microporous plates 2 are disposed alternately and connected by wires (which are conventional and therefore not illustrated and not described in detail to avoid redundancy) to the positive and negative poles of the DC power supply 5, respectively. Nevertheless, the device with microbubble-induced superhydrophobic surfaces for drag reduction and biofouling prevention can include only one anodic microporous plate 1 and only one cathodic microporous plate 2.

The seawater can be electrolyzed to generate hydrogen microbubbles adjacent to and covering the surface of each anodic microporous plate 1 and to generate oxygen microbubbles adjacent to and covering the surface of each cathodic microporous plate 2. Thus, a superhydrophobic surface is formed on the surface of each of the anodic microporous plates 1 and the cathodic microporous plates 2 to provide microbubble drag reduction effect. Furthermore, the electric current flowing through the anodic microporous plates 1 and the cathodic microporous plates 2 can prevent biofouling.

Furthermore, the anodic microporous plates 1 and the cathodic microporous plates 2 according to the invention are mounted to the bottom plate 3 of the hull without any external piping, avoiding the risk of structural safety or sealing of the hull. Thus, the area of the bottom plate 3 covered by the anodic microporous plates 1 and the cathodic microporous plates 2 can be increased on the premise of the structural safety of the hull, obtaining enhanced microbubble drag reduction effect by providing uniform supply of gas (i.e., the gases generated by electrolysis) and by avoiding the bubbles from becoming larger due to overlapping.

Figures 1A, 1B:
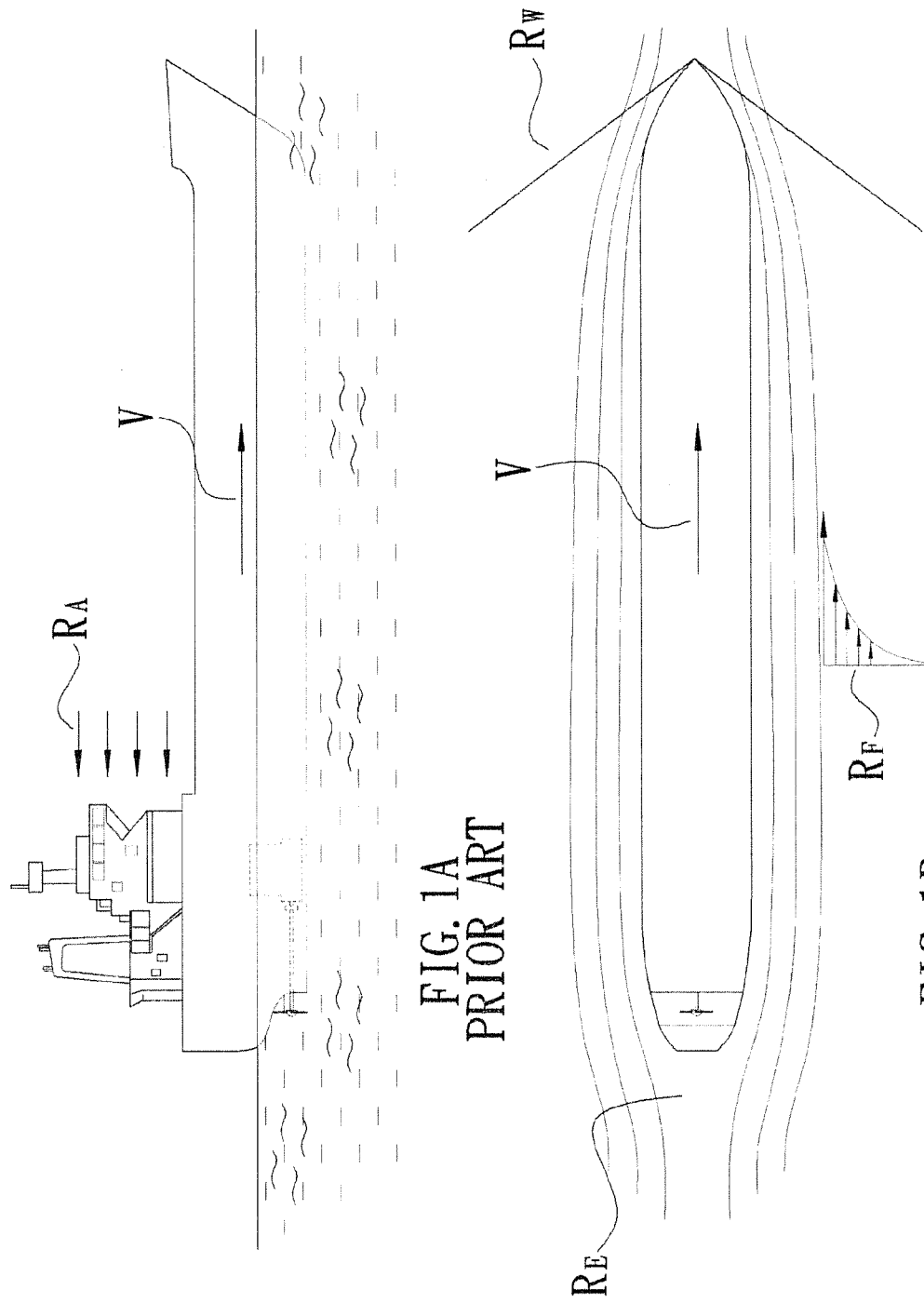
FIG. 1A shows a diagrammatic side view illustrating resistances to movement of a ship.
FIG. 1B shows a top view of the ship of FIG. 1A.
Figure 2A:
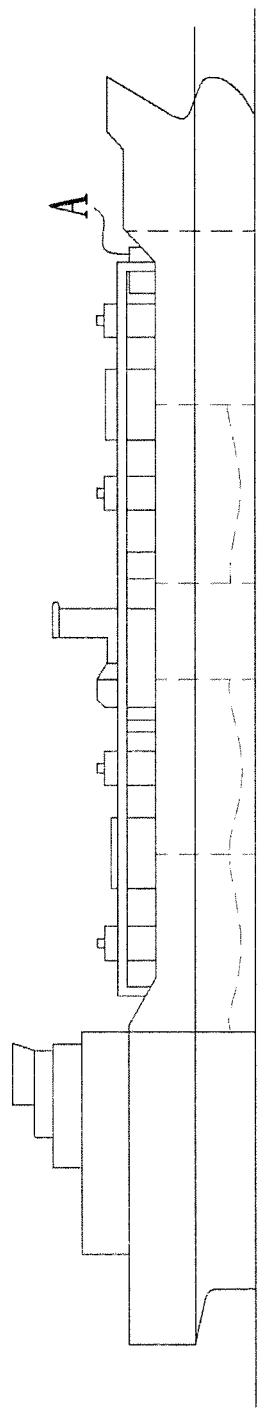
FIG. 2A shows a side view of a ship provided with a micro-bubble drag reduction device using a conventional porous plate allowing passage of compressed air.
Figure 2B:
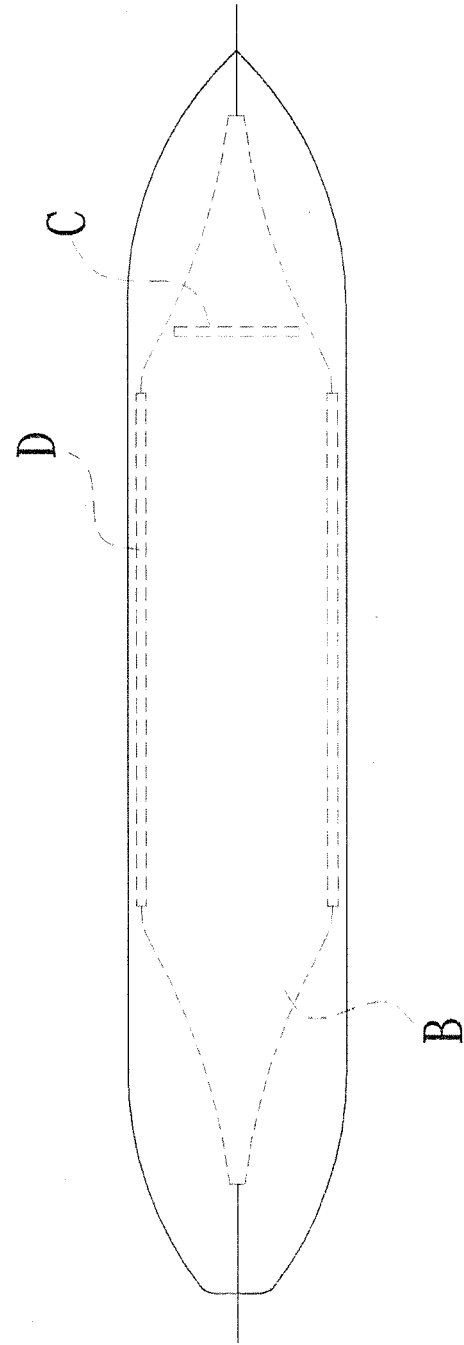
FIG. 2B shows a top view of the ship of FIG. 2A.
Figure 3A:
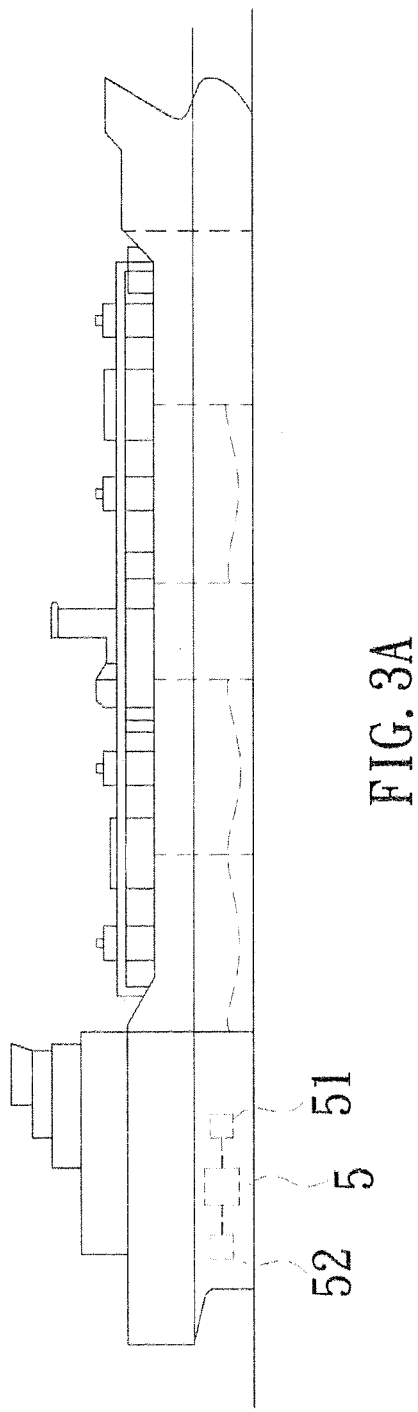
FIG. 3A shows a side view of a ship, with a device capable of forming a superhydrophobic surface, reducing drag by using microbubbles, and inhibiting marine biofouling according to the present invention mounted to a bottom plate of a hull of the ship.
Figure 3B:
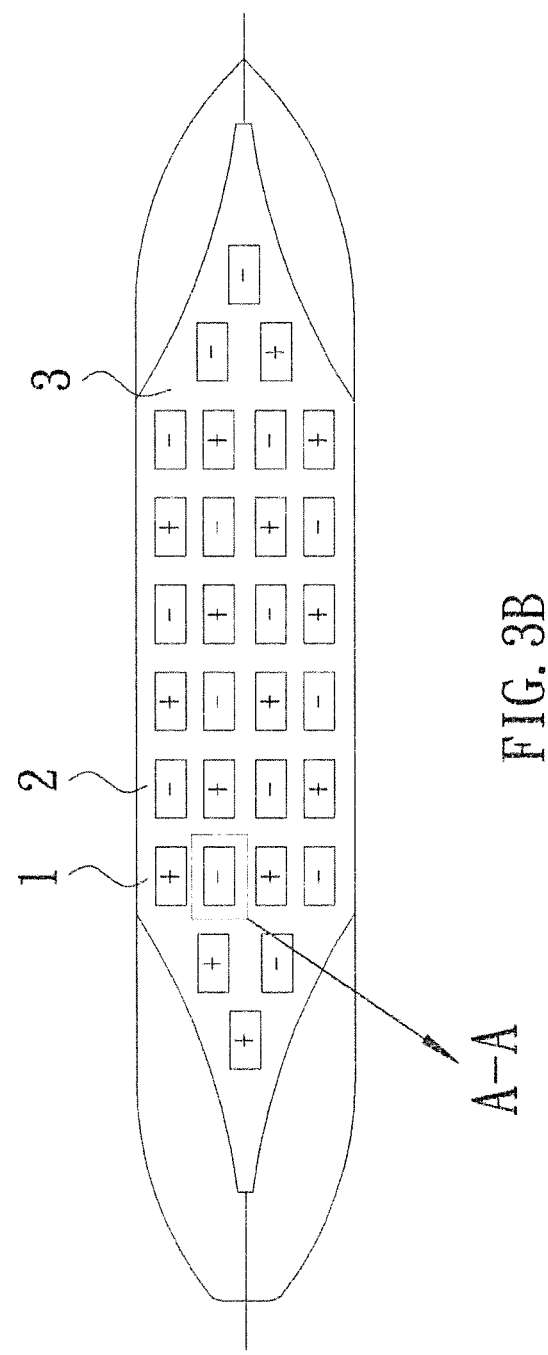
FIG. 3B shows atop view of the ship of FIG. 3A.
Figure 7:
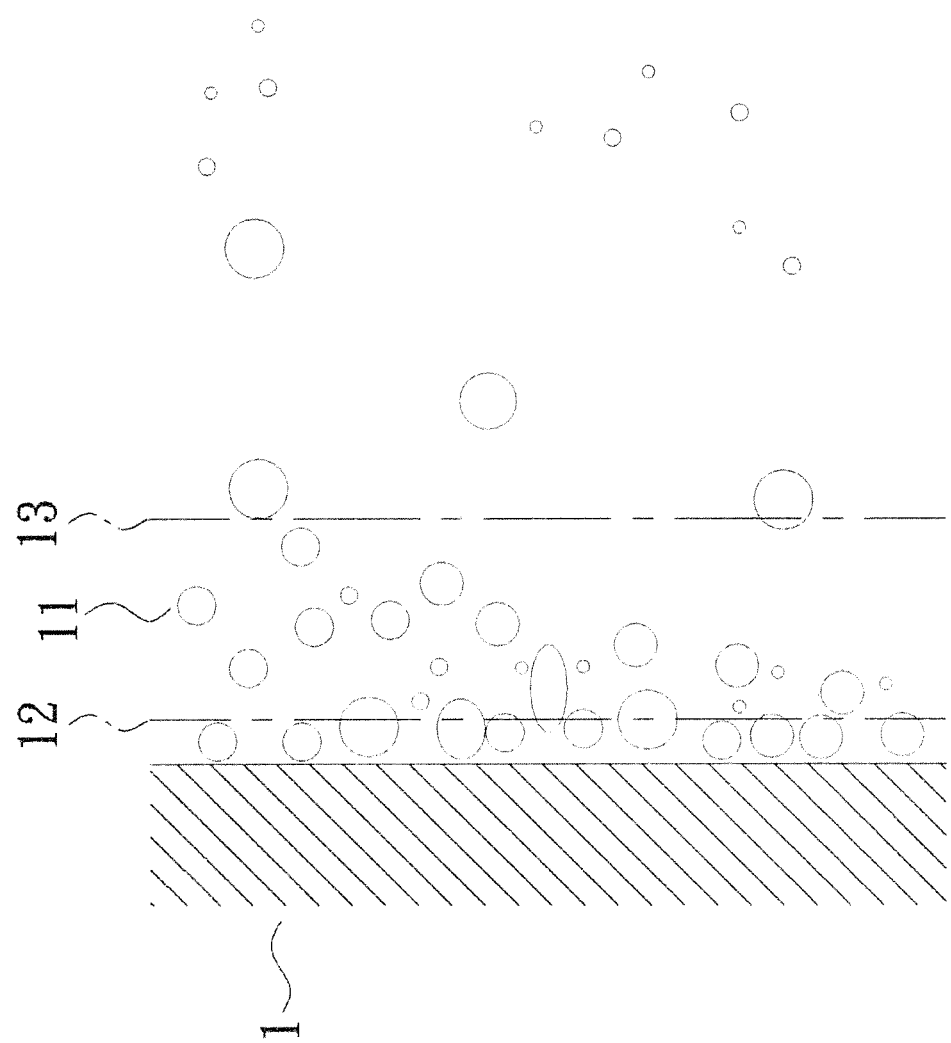
FIG. 7 shows formation of nucleuses of microbubbles and nucleation into microbubbles on the surface of an electrode during electrolysis.

With reference to FIGS. 3A, 3B, and 7, overlapping of bubbles means two or more bubbles accumulates and combine with each other and become larger after formation of nucleuses on the anodic microporous plate 1 or the cathodic microporous plate 2. Formation of a nucleus is a state a bubble just forms. Since the bubbles generated on the anodic microporous plates 1 and the cathodic microporous plates 2 by electrolysis come from the cracking reaction of oxidization and reduction of water molecules, the diameters of the bubbles are small. Furthermore, since the pressure of the bubbles is low, the bubbles entering the flow field are not apt to expand and overlap, avoiding the bubbles from becoming larger. Thus, the bubbles can stay longer in the boundary layer. In the porous plate C shown in FIG. 2B, the released air obtained from passing compressed air through the porous plate C has high pressure and a larger amount of bubbles that are apt to expand and overlap after entering the flow field, such that the bubbles can only stay in the boundary layer for a short period of time, reducing the drag reducing effect. Namely, when the ship moves on the water surface, the longer the bubbles on the hull surface below the water surface stay in the boundary layer, the higher the drag reducing effect. The more amount of the bubbles overflows out of the boundary layer or the shorter the bubbles stay in the boundary layer, the lower the drag reducing effect, which will be described in detail hereinafter. Furthermore, most of the microbubbles generated by electrolysis adhere to the microporous plate, as shown in FIG. 7. Thus, the microbubbles can stay in the boundary layer.

Further, the microbubble drag reduction effect relates to the direction of the hull surface. Generally, the microbubble drag reduction effect is the best on horizontal surfaces of the hull (such as the bottom plate 3) and the poorest on vertical surfaces of the hull (such as the port and the starboard). Taking installation and costs into consideration, the anodic microporous plates 1 and the cathodic microporous plates 2 are mounted to the bottom plate 3 and alternately disposed to balance the ions between the electrodes and the yield of hydrogen and oxygen.

With reference to FIGS. 4A and 4B, to avoid short circuit that results in hindrance to electrolysis, each cathodic microporous plate 2 is fixed to the bottom plate 3 made of metal in an insulating manner. Specifically, each cathodic microporous plate 2 is fixed by insulating bolts 31 to the bottom plate 3 of the hull. Each anodic microporous plate 1 is mounted to the bottom plate 3 in the same way. In a case that the hull is made of aluminum, a plurality of micropores can be formed in the hull by microarc oxidation or anodic oxidation, and graphite is deposed on a portion of a working surface (the surface in contact with the seawater) below the water surface. Platinum is deposed on another portion of the working area, completing the aluminum anodic microporous plate (C—Al$_2$O$_3$/Al) and the cathodic microporous plate (Pt—Al$_2$O$_3$/Al) according to the invention. Since the aluminum hull is integrally formed without additional work in assembly, insulating bolts 31 are not required.

FIG. 5 shows slip effect between the seawater and the hull surface below the sea surface. The ideal drag reducing effect according to the invention is based on the slip effect. Specifically, when a ship sails in the sea, if an air layer 62 of a thickness H exists in a boundary layer (not shown) between the seawater 61 and the hull surface 6 below the water surface, the relation between the thickness H of the air layer 62 and the apparent slip length L can be expressed by the following equation:

$$L = H[\mu_L/\mu_G - 1]$$

wherein $\mu_L$ is the viscosity of seawater, and $\mu_G$ is the viscosity of air.

Assuming no slip exists between the hull surface 6 below the water surface and the seawater 61 and assuming the flow filed of the seawater 61 is an ideal laminar flow, when the ship moves in the seawater 61 at a speed V, the thickness H is the distance between the hull surface 6 and a location below the water surface where the speed of seawater 61 is equal to 0.95V. Since the air viscosity $\mu_G$ is much smaller than the seawater viscosity $\mu_L$, the apparent slip length L is much larger than and in proportion to the thickness H of the air layer 62. Since the larger the apparent slip length L, the smaller the frictional resistance to the hull surface 6 below the water surface, and since the apparent slip length L is in proportion to the thickness H of the air layer 62, the frictional resistance to the ship is smaller if the thickness H of the air layer 62 is larger.

With reference to FIGS. 3A, 3B, 6, and 7, in which FIG. 6 shows ideal slip effect on the anodic microporous plate 1 according the invention. The ideal slip effect on the cathodic microporous plate 2 is identical to that of the anodic microporous plate 1. The anodic microporous plate 1 mounted to the bottom plate 3 generates oxygen microbubbles due to electrolysis of seawater by application of external electric current. After formation of nucleuses adjacent to the surface of the anodic microporous plate 1, a portion of the oxygen microbubbles adhere to the inner surface 41 of each micropore 4, another portion of the oxygen microbubbles adhere to the outer surface 42 and, thus, locate in the thickness of the boundary layer, and another portion of oxygen microbubbles overflows out of the boundary layer. The microbubbles on the inner surface 41 of each micropore 4 nucleate into bubbles of larger diameters and, thus, forms air bags on the inner surface 41 of each micropore 41, providing better slip effect. Namely, the oxygen microbubbles generated by electrolyzing seawater can form a superhydrophobic surface on the anode microporous plate 1.

FIG. 7 shows formation of nucleuses of microbubbles and nucleation into microbubbles on the surface of an electrode during electrolysis. As can be seen from this figure, the microbubbles 11 form an adhering area extending from the surface of the anodic microporous plate 1 to an adhering boundary 12. When the microbubbles 11 reach the expanding boundary 13, the microbubbles 11 will obviously expand and move away from the surface of the anodic microporous plate 1. In a case that relative movement exists between the surface of the electrode and the electrolyte (the seawater), the adhering area is located in the boundary layer of the field flow. Formation of the nucleuses and nucleation of the microbubbles on the surface of the cathodic microporous plate 2 are substantially the same as those on the anodic microporous plate 1.

By such an arrangement, the invention provides more microbubbles adhered to the outer surface 42 or the inner surface 41 of each micropore 4 and provide an air layer having a large area (FIG. 6). The conventional microbubble reducing device (FIG. 2) using a microporous plate to intensively release compressed air in a small area such that the microbubbles are carried away from the boundary layer by water currents and, thus, can not effectively create an air layer having a large area. The disadvantages of this microbubble reducing device are avoided by the invention.

Figure 8:
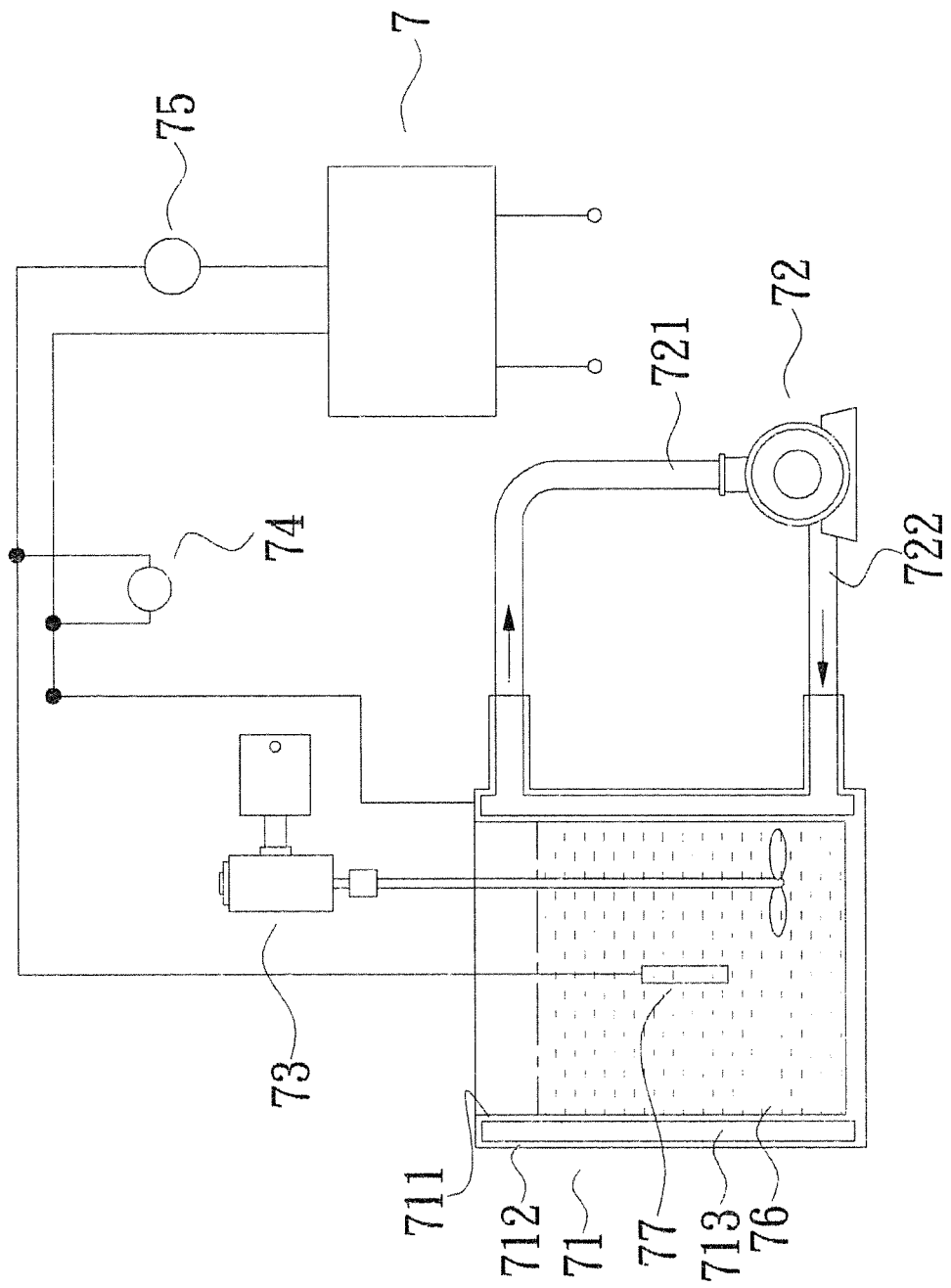
FIG. 8 shows a microarc oxidation system for preparing a TiO$_2$/Ti film.
Figure 12A:
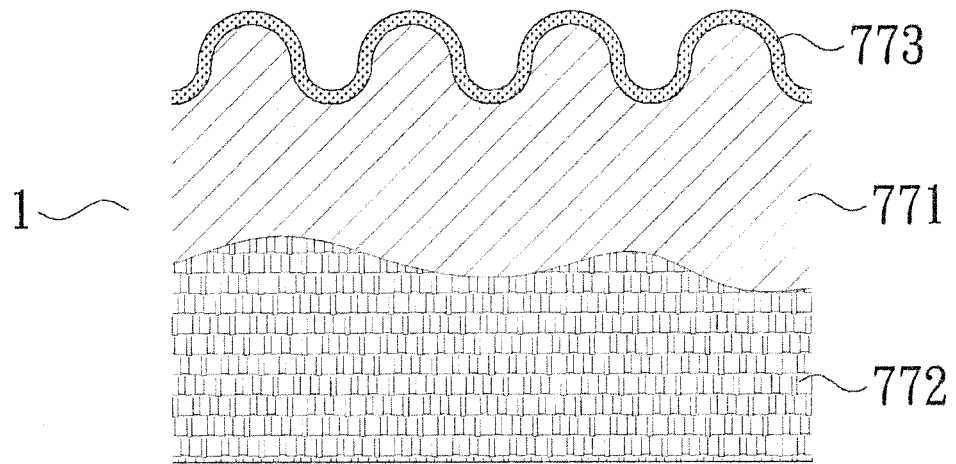
FIG. 12A shows a cross sectional view of the anodic microporous plate.
Figure 12B:
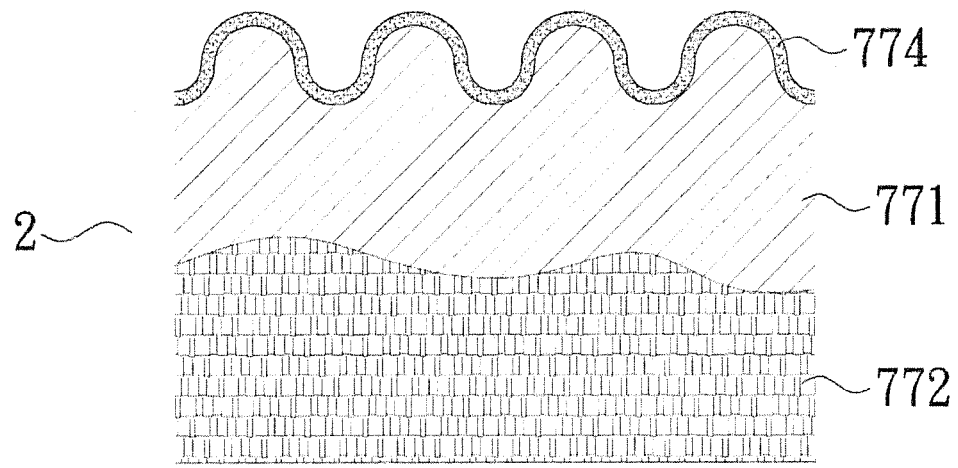
FIG. 12B shows a cross sectional view of the cathodic microporous plate.

With reference to FIGS. 8, 12A, and 12B, micropores 4 in the surface of each of the anodic microporous plates 1 and the cathodic microporous plates 2 according to the present invention are formed in a surface of a substrate after microarc oxidation or anodic oxidation of the substrate. Each substrate is a titanium plate, an aluminum plate, or a titanium alloy plate containing more than 50% of titanium. The principles and procedures of microarc oxidation or anodic oxidation for forming micropores in the surface of the titanium plate, aluminum plate, and titanium alloy plate are similar. Furthermore, the equipment and techniques involved in microarc oxidation and anodic oxidation are almost the same. The only difference is that the microarc oxidation requires a higher voltage to activate the microarcs, by which it is called. Examples of forming micropores in a surface of a titanium plate 77 by microarc oxidation will now be described.

Titanium plates 77 are used as substrates and submerged in an electrolyte. A plurality of micropores is formed in the surfaces of the titanium plates 77 by microarc oxidation (MAO) or known as plasma electrolytic oxidation (PEO) or microplasma oxidation (MPO). The surface including the plurality of micropores will be referred to as $TiO_2$/Ti film.

The microarc oxidation system includes a power supply 7, a dual-layer stainless steel container 71, a cooling water pump 72, and an agitator 73. The power supply 7 is connected to an ammeter 74 and a voltmeter 75. The dual-layer stainless steel container 71 includes an inner periphery 711 defining a space receiving an electrolyte 76. A cooling space 713 is defined between the inner periphery 711 and a housing 712 receives circulating cooling water. The electrolyte 76 consists of 15 g/L, of $Na_2WO4$, 2 g/L of NaF, and water. Each titanium plate 77 is submerged in the electrolyte 76 and acts as an anode and is connected by a wire to the power supply 7. The dual-layer stainless steel container 71 acts as a cathode of the system and is connected by another wire to the power supply 7. The cooling space 713 is connected to an inlet 721 and an outlet 722 of the cooling water pump 72. When preparing the $TiO_2$/Ti film 771, the power supply 7 provides a voltage of 250V-350V and an electric current of 10 A (the voltage and the electric current can be adjusted according to the area of the plate) to each titanium plate 77. Many microarcs having a temperature of 1,350-1,750° C. (the temperature in interior of each microarc may reach 6,500-9,200° C.) are generated on the surface of each titanium plate 77. The high-temperature microarcs melt the surface of each titanium plate 77. A portion of the molten surface of the titanium plate 77 is oxidized into Titanium oxide, and another portion still remains as titanium. Thus, a $TiO_2$/Ti film 771 is formed on the surface of the titanium plate 77, with the remaining portion being a titanium layer 772 (FIGS. 12A and 12B). As the procedure continues, the high-temperature microarcs are continually formed to melt and oxidize each titanium plate 77, the density of the holes in the microporous surface of each titanium plate 77 increases, and the holes become deeper. After 30 minutes of microarc oxidation, the $TiO_2$/Ti film 771 has a hole density of 15%-25%, and the depth of the holes is about 20 which meets the actual need.

Figure 9:
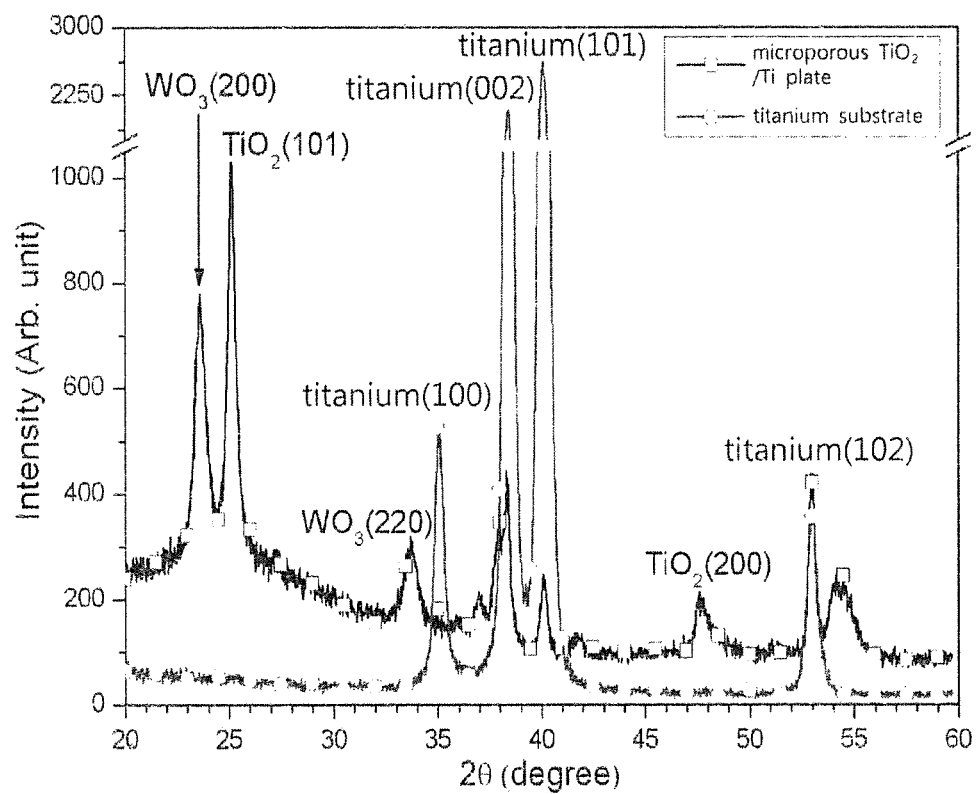
FIG. 9 shows an X-ray diffraction analysis diagram of the TiO$_2$/Ti film.

With reference to FIG. 9, the $TiO_2$/Ti film 771 presents a mixed phase of anatase and titanium after X-ray diffraction analysis. The residual titanium can reduce the resistivity of the $TiO_2$/Ti film to about $4 \times 10^2$ $\Omega \cdot m$, which is higher than the resistivity ($4.2 \times 10^{-7}$ $\Omega \cdot m$) of each titanium plate 77 but much lower than the resistivity ($5 \times 10^5$ $\Omega \cdot m$) of pure anatase. At the same time, energy-dispersive X-ray spectroscopy (EDS) of transmission electron microscope (TEM) also confirmed existence of residual titanium in the $TiO_2$/Ti film 771. Since low resistivity is one of the most important factors of the electrode of electrolysis for generating gases, the titanium residing in the $TiO_2$/Ti film 771 is the key of effective transmission of electrons during application of electric current, although the $TiO_2$/Ti film 771 is an insulating semiconductor (the $TiO_2$/hi film 771 becomes a conductor under ultraviolet light and, is, thus, called a photocatalyst).

Figure 10:
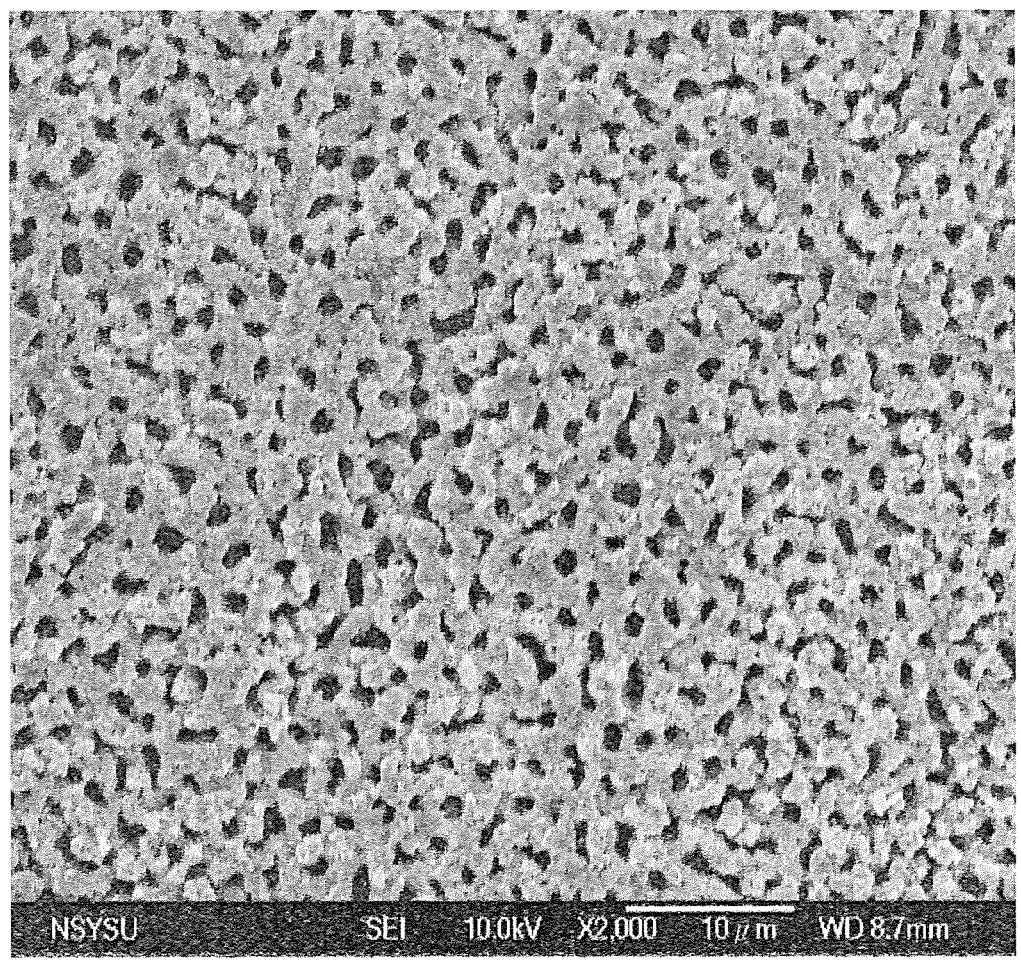
FIG. 10 shows an SEM (scanning electron microscope) picture of the TiO$_2$/Ti film magnified 2,000 times.
Figure 11:
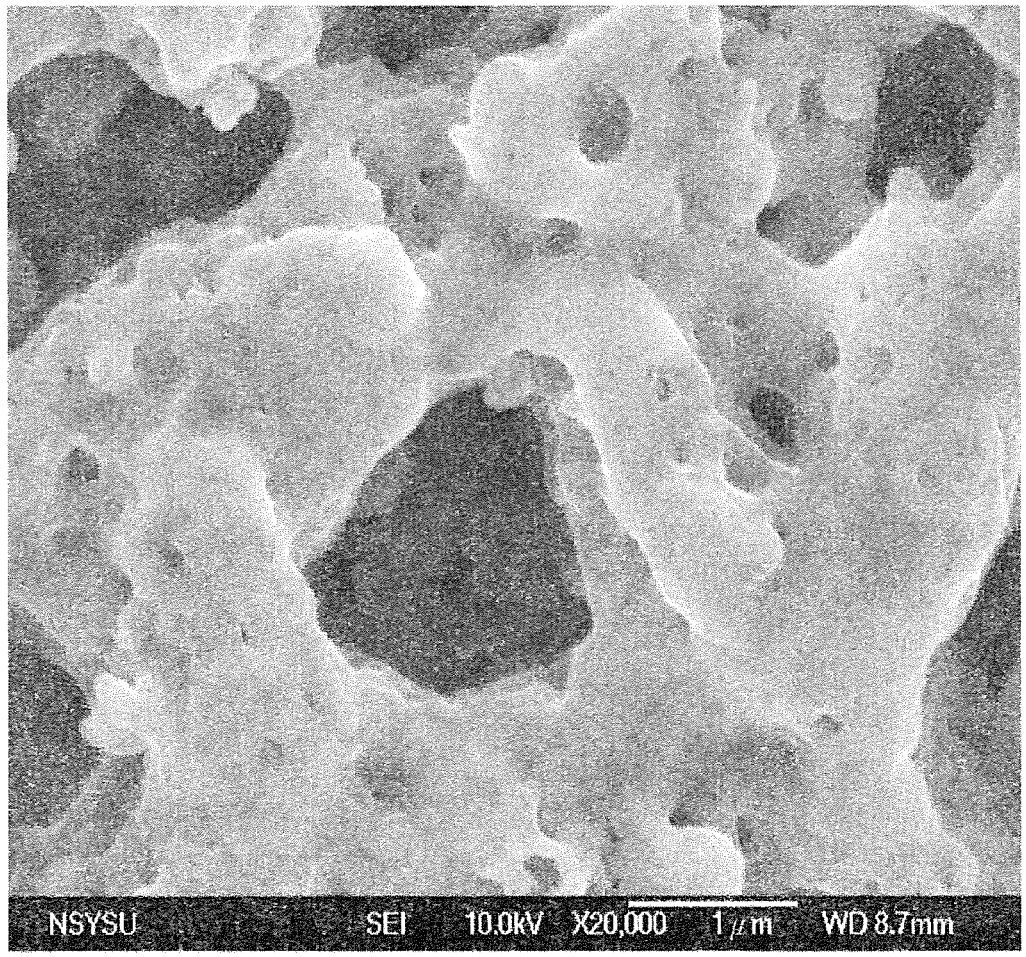
FIG. 11 shows an SEM of the TiO$_2$/Ti film magnified 20,000 times.

Many micropores can be seen in an SEM (scanning electron microscope) picture of the $TiO_2$/Ti film 771 magnified 2,000 times, as shown in FIG. 10. When the $TiO_2$/Ti film 771 is magnified 20,000 times, many holes of submicron scale and of nanometer scale in each micropore can be seen, as shown in FIG. 11. Such structure is advantages to adherence of gas or air and increases hydrophobicity (i.e., reduces the frictional resistance). Furthermore, since the $TiO_2$/Ti film 771 contains many $TiO_2$ phases of anatase, the hardness of the $TiO_2$/Ti film 771 is about 6-9 Gpa (the hardness of $TiO_2$ of anatase is about 12-15 Gpa), which is much higher than the hardness (smaller than 0.3 Gpa) of the steel sheets of the ship and higher than the hardness of the paint on the bottom of the ship. Thus, the $TiO_2$/Ti film 771 is durable and can be used on the hull surface for a long period of time.

Furthermore, other than the other techniques (such as dip-coating, sputtering, and electrolysis, that can only prepare smooth $TiO_2$/Ti film), the $TiO_2$/Ti film prepared by the microarc oxidation technique can rapidly (in less than 30 minutes) form a $TiO_2$/Ti film having a depth larger than 20 μm and an area larger than 3×3 m² in a surface of a titanium plate at low costs.

With reference to FIGS. 12A and 12B, although the resistivity of the prepared $TiO_2$/Ti film 771 is still much higher than pure titanium, excellent material for electrode is still required for preventing electrical corrosion when used as the anode for generating gases from seawater. In this regard, a layer of graphite 773 of a thickness of 10-20 nm can be coated on the $TiO_2$/Ti film 771, obtaining the anodic microporous plate (C—$TiO_2$/Ti) according to the invention, wherein the resistivity of the $TiO_2$/Ti film 771 can be reduced to 92 Ω·m. Furthermore, a layer of platinum 774 can be coated on the $TiO_2$/Ti film 771, obtaining the cathodic microporous plate (Pt—$TiO_2$/Ti) according to the invention, wherein the resistivity of the $TiO_2$/Ti film 771 can be reduced to $2\times10^{-2}$ Ω·m. The deposition of graphite or platinum can be carried out on the surface of the $TiO_2$/Ti film 771 facing the seawater. Deposition on the other surface of the $TiO_2$/Ti film 771 in contact with the hull surface is not required. Electrical conduction of deposition of graphite or platinum on an aluminum plate or a titanium alloy plate is similar to that of deposition of graphite or platinum on the titanium plate.

With reference to FIGS. 3A and 3B, the DC power supply 5 further includes an electrode polarity converting device 51 to switch the direction of the electric current after the electrolysis has undergone for a period of time. Namely, the polariy of the DC power 5 connected to the electrode of each anode microporous plate 1 changes from the positive to the negative, and the polariy of the DC power 5 connected to the electrode of each cathodic microporous plate 2 changes from the negative to the positive. The same procedure is carried out again after the electrolysis has undergone for another period of time. This can increase the yield of gases. The structure of the electrode polarity converting device 51 is conventional and, therefore, not described in detail to avoid redundancy.

With reference to FIGS. 3A and 3B, the DC power supply 5 can further include a voltage adjuster 52 to allow adjustment of voltage for adjusting the yield of hydrogen and oxygen. Thus, the voltage can be adjusted according to the need in actual use. The voltage adjuster 52 is conventional and therefore not described in detail to avoid redundancy.

In experiments in a laboratory, when the anodic microporous plate (C—$TiO_2$/Ti) (of 75×25×1 mm) and the cathodic microporous plate (Pt—$TiO_2$/Ti) (of 75×25×1 mm) were supplied with 4V DC currents to electrolyze seawater, oxygen was generated adjacent to the anodic microporous plate (C—$TiO_2$/Ti), and hydrogen was generated the cathodic microporous plate (Pt—$TiO_2$/Ti). The electricity consumed was about 20-30 W/m². The loss of energy was relatively small.

Furthermore, during sailing of the ship, the DC current applied to the anodic microporous plates 1 and the cathodic microporous plates 2 according to the invention can inhibit adherence of micro organisms. When the ship is moored, a smaller amount of electric current is sufficient to effectively inhibit parasitism of microbial films, inhibiting marine biofouling.

In brief, the concept of the invention is to bond a shark suit (the anodic microporous plates 1 and the cathodic microporous plates 2) to the hull and generates gases by electrolysis (which is similar to excretion of slime by a fish skin) to form a superhydrophobic surface for reducing the frictional resistance to the ship without using any paint for preventing rusting or preventing marine biofouling. Thus, the invention is energy-saving and eco-friendly.

Although specific embodiments have been illustrated and described, numerous modifications and variations are still possible without departing from the essence of the invention. The scope of the invention is limited by the accompanying claims.

The invention claimed is:

1. A device with microbubble-induced superhydrophobic surfaces for drag reduction and biofouling prevention comprising an anodic microporous plate, a cathodic microporous plate, and a DC power supply, with the anodic microporous plate and the cathodic microporous plate adapted to be mounted to a hull surface of a ship, with the DC power supply including a positive pole electrically connected to the anodic microporous plate and a negative pole electrically connected to the cathodic microporous plate, with seawater being electrolyzed to generate hydrogen microbubbles adjacent to a surface of the cathodic microporous plate and to generate oxygen microbubbles adjacent to a surface of the anodic microporous plate, forming superhydrophobic surfaces on the surfaces of the anodic microporous plate and the cathodic microporous plate, with electric current flowing through the anodic microporous plate and the cathodic microporous plate to prevent biofouling.

2. The device as claimed in claim 1, with the surface of each of the anodic microporous plate and the cathodic microporous plate including a plurality of micropores, with the plurality of micropores being formed in a surface of a substrate after microarc oxidation or anodic oxidation of the substrate, with the substrate being a titanium plate, an aluminum plate, or a titanium alloy plate containing more than 50% of titanium.

3. The device as claimed in claim 1, with the anodic microporous plate formed by subjecting a first substrate to microarc oxidation or anodic oxidation and then forming a layer of graphite on a surface of the first substrate, with the cathodic microporous plate formed by subjecting a second substrate to microarc oxidation and then forming a layer of platinum on a surface of the second substrate, with each of the first and second substrates being a titanium plate, an aluminum plate, or a titanium alloy plate containing more than 50% of titanium.

4. The device as claimed in claim 1, with the anodic microporous plate having a resistivity smaller than 200 Ω·m, with the cathodic microporous plate having a resistivity smaller than 10 Ω·m.

5. The device as claimed in claim 1, with the surface of each of the anodic microporous plate and the cathodic microporous plate having a hardness not smaller than 1.0 Gpa and having a hole density of about 10%-50%, with each of the plurality of micropores having a depth not smaller than 10 µm, with the hole density of the anodic microporous plate being a quotient of an overall cross sectional areas of the plurality of micropores in the anodic microporous plate divided by an overall area of the anodic microporous plate, with the hole density of the cathodic microporous plate being a quotient of an overall cross sectional areas of the plurality of micropores in the cathodic microporous plate divided by an overall area of the cathodic microporous plate.

6. The device as claimed in claim 1, with the DC power supply further including an electrode polarity converting device to switch a direction of the electric current after the electrolysis has undergone for a period of time, with an electrode of the anode microporous plate electrically connected to the negative pole of the DC power supply and with an electrode of the cathodic microporous plate electrically connected to the positive pole of the DC power supply, with the direction of the electric current being switched again after the electrolysis has undergone for another period of time.

7. The device as claimed in claim 1, with the DC power supply further including a voltage adjuster to allow adjustment of voltage for adjusting a yield of hydrogen and oxygen.

8. The device as claimed in claim 1, with the anodic microporous plate and the cathodic microporous plate adapted to be mounted to a bottom plate of the ship.

* * * * *